(54) WIDE-BAND OPTICAL FIBER AMPLIFIER AND AMPLIFYING METHOD THEREOF

(75) Inventors: Soo-Young Yoon; Seong-Teak Hwang; Rae-Sung Jung; Jeong-Mee Kim; Sung-Jun Kim, all of Kyonggi-do (KR)

(73) Assignee: Samsung Electronics, Co., Ltd., Suwon (KR)

( * ) Notice: Subject to any disclaimer, the term of this patent is extended or adjusted under 35 U.S.C. 154(b) by 13 days.

(21) Appl. No.: 09/610,321

(22) Filed: Jul. 5, 2000

(30) Foreign Application Priority Data

Jul. 7, 1999 (KR) .............................. 99-27276

(51) Int. Cl.[7] .............................. H04B 10/12; H01S 3/00
(52) U.S. Cl. .................................. 359/341.32; 359/349
(58) Field of Search .................... 357/341.32, 341.4, 357/341.3, 341.1, 337.11

(56) References Cited

U.S. PATENT DOCUMENTS

| | | | | |
|---|---|---|---|---|
| 5,434,701 A | * | 7/1995 | Fatehi | 359/341 |
| 5,572,357 A | * | 11/1996 | Nakazato | 359/341 |
| 5,825,520 A | * | 10/1998 | Huber | 359/130 |
| 5,892,781 A | | 4/1999 | Pan et al. | 372/6 |
| 5,978,131 A | * | 11/1999 | Lauzon et al. | 359/160 |
| 6,049,417 A | | 4/2000 | Srivastava et al. | 359/341 |
| 6,049,418 A | | 4/2000 | Srivastava et al. | 359/341 |
| 6,104,527 A | * | 8/2000 | Yang | 359/341 |
| 6,222,670 B1 | * | 4/2001 | Ryu et al. | 359/345 |
| 6,317,254 B1 | * | 11/2001 | Park et al. | 359/341.33 |
| 6,339,495 B1 | * | 1/2002 | Cowle et al. | 359/174 |
| 6,356,385 B1 | * | 3/2002 | Digonnet et al. | 359/337 |

FOREIGN PATENT DOCUMENTS

FR    2 786 325 A1    5/2002

OTHER PUBLICATIONS

IEEE, US Publication No. XP-000882916 to Ju Han Lee et al.
Electronics Letters Publication No. XP-006008152 to Y. Sun et al.
Kashyap, R. et al. "Wideband Gain Flattened Erbium Fibre Amplifier using a Photosensitive Fibre Blazed Grating." Electron. Lett. vol. 29, No. 2, Jan. 21, 1993. pp 154–156.*
Ono, H. et al. "1.58 um band Er3+-Doped fibre amplifier pumed in the 0.98 and 1.48 um bands." Elect. Lett, vol. 33 No. 10, May 8, 1997. pp. 876–877.*
Min, B. et al. "Performance Improvement of wideband EDFA by ASE Injection from C band to L band Amplier." APCC/OECC '99; Fifth Asia–Pacific Conference on . . . ; and 4th Optoelectronics and Communications Conf., vol. 2, Jun. 1999. pp 1346–1347.*
Lee, J. et al. "Enhancement of Power Conversion Efficiency of an L–Band EDFA with a Secondary Pumping Effect in the Unpumped EDF Section." IEEE Photonics Tech. Lett. vol. 11, No. 1, Jan. 1999. pp. 42–44.*
Kinoshita, S. "Broadband Fiber Optic Amplifiers." Optical Fiber Communication Conference and Exhibit, 2001. OFC 2001, vol.: 2, 2001. pp. TuA1–2–TuA1–04.*

(List continued on next page.)

Primary Examiner—Thomas H. Tarcza
Assistant Examiner—Andrew R. Sommer
(74) Attorney, Agent, or Firm—Robert E. Bushnell, Esq.

(57) ABSTRACT

A method and apparatus for amplifying the optical signals of a C-band (1550 nm wavelength band) and a L-band (1580 nm wavelength band) in a wide-band optical fiber amplifier, wherein the incoming optical signals are separated into the 1550 nm wavelength band and the 1580 nm wavelength band by a WVDM optical coupler and respectively amplified by a C-band EDFA and a L-band EDFA A backward ASE generated by the C-band EDFA is fed back to the L-band EDFA by a circulator as a supplementary pumping light to the amplification of the optical signals of the 1580 nm wavelength band.

19 Claims, 7 Drawing Sheets

OTHER PUBLICATIONS

Chung, H.S, et al. Demonstration of 540–dB Loss Compensation Over 52 nm Gain Bandwidth with Wideband Erbium–Doped Fiber Amplifiers. CLEO Jun. 1999, pp. 644–645.*

Yamada, H. "Broadband and gain–flattened amplifier composed of a 1.55 um–band and a 1.58 um–band Er3+ doped fibre amplifier in a parallel configuration." Elec. Lett, Apr. 10, 1997, vol. 33, No. 8, pp. 710–711.*

Buxens, A. et al. "Gain flattened L–Band EDFA based on upgraded C–Band EDFA using forward ASE pumpling in an EDF section." Elect. Lett. 36:9, pp. 821–823.*

Flood, F. A. "Impact of pump and signal wavelength on inhomogeneous characteristics of L–Band EDFAs." OFCC Mar. 2000. pp. 117–119.*

Hansen, K.P. and Nielsen, M.D. "L–Bnd Erbium Doped Fiber Ampliferis—Theory and Design" M.S. Theisis, Jan. 31, 2000, pp. 1–105.*

Becker, P.C. et al. "Erbium–Doped Fiber Amplifiers: Fundamentals and Technology." Academic Press, San Diego, 1999, p. 251–319.*

* cited by examiner

WIDE-BAND OPTICAL FIBER AMPLIFIER AND AMPLIFYING METHOD THEREOF

CLAIM OF PRIORITY

This application makes reference to, incorporates the same herein, and claims all benefits accruing under 35 U.S.C §119 from an application entitled Wide-Band Optical Fiber Amplifier And Amplifying method Thereof earlier filed in the Korean Industrial Property Office on Jul. 7, 1999, and there duly assigned Serial No. 99-27276 by that Office.

BACKGROUND OF THE INVENTION

1. Field of the Invention

The present invention relates to an optical fiber amplifier, and more particularly to an optical fiber amplifier for amplifying optical signals of the wavelength band of 1530 nm to 1610 nm, and a method therefore.

2. Description of the related art

Optical fiber amplifiers are the devices for directly amplifying optical signals without converting them into electrical signals, so that they do not employ optoelectronic repeaters, simplified in structure and economical in cost. They consist of active optical fiber, pumping lasers, optical couplers for providing combined optical signals and pumped light (hereinafter referred to as "pump") to the active optical fibers, and optical isolators.

The active optical fiber is doped with Er (Erbium[68]), Pr (Praseodymium[59]), and/or Yb (Ytterbium[70]) of the rare-earth group in the core, providing stimulated emission. See U.S. Pat. No. 5,892,781 to Jing-Jong Pan et al. entitled High Output Fiber Amplifier/Lasers For Fiberoptic Networks. The pump provided by the pump laser stimulates the rare-earth element doped in the core into highly ionized state, which makes the emission to amplify an optical signal coming into the active optical fiber. The widely used WDM (Wavelength Division Multiplexing) optical transmission system chiefly employs the wavelength band of 1550 nm (about 1530 nm to 1560 nm) as the signal band, and thus the erbium doped fiber amplifier (EDFA) especially suitable for amplifying an optical signal of the 1550 nm wavelength band.

FIG. 1 is a graph showing the gain characteristics of the incoming optical signals of an EDFA according to wavelengths based on the ratio of population inversion of $Er^{+3}$ ions, where the gain characteristics are graphed with the ratio of population inversion being 0%, 10%, 20%, . . . 100%. The state of the ratio of population inversion being 0% indicates that all erbium ions are in the ground state, where the gain characteristics represent the maximum power loss around 1530 nm wavelength due to light absorption, as shown in FIG. 1. As the ratio of population inversion increases up to 100%, where all erbium ions becomes excited, the gain approaches the maximum value around 1530 nm wavelength. Hence, the ratio of population inversion of erbium ions is usually maintained at a suitable level of 70 to 100% to amplify the optical signals of 1550 nm wavelength band of 1530 nm to 1560 nm.

As shown in FIG. 1, however, the gain characteristics are different along the wavelengths for each ratio of population inversion. Namely, 1530 nm wavelength has the highest gain, and 1560 nm wavelength the lowest gain. Such gain irregularity along the wavelengths may be flattened by employing various means such as an optical filter for properly dampening the optical signals of 1530 nm wavelength region.

Recently, a wide-band WDM optical transmission system has been developed to use 1580 nm wavelength band of 1575 nm to 1605 nm as the signal band including 1550 nm wavelength band. Hereinafter, the 1550 nm wavelength band is called "C-band", and the 1580 nm wavelength band "L-band". Referring again to FIG. 1, when the ration of population inversion of erbium ions in EDF is maintained around 30% to 40%, there is obtained a gain flattened bandwidth of about 30 nm having a small gain in the 1580 nm wavelength band. Since the gain per unit length of EDF is very smaller in 1580 nm wavelength band than in 1550 nm wavelength band, the length of EDF for amplifying the optical signals of 1580 nm wavelength band should be about 10 to 20 times the length in the case of 1550 nm wavelength band.

To this end, there has been developed a wide-band EDFA for amplifying the optical signals of both C-band (1550 nm wavelength band) and L-band (1580 nm wavelength band), which comprises an L-EDFA for amplifying the optical signals of the L-band arranged in parallel with a C-EDFA for amplifying those of the C-band. Referring to FIG. 2 for illustrating such parallel structured wide-band EDFA, the conventional wide-band EDFA 10 comprises an L-EDFA (Long-band EDFA) 14 for amplifying the optical signals of the L-band arranged in parallel with a C-EDFA (Conventional-band EDFA) 12 for amplifying the optical signals of the C-band. The optical signals coming into the input terminal 15 are separated by an input 1550/1580 nm WDM optical coupler 16 into the optical signals of the C-band and those of the L-band, which are respectively inputted to the C-EDFA 12 and L-EDFA 14, combined by an output 1550/1580 nm WDM optical coupler 18 and delivered to the output terminal 19.

Because such a wide-band EDFA should firstly secure the amplifying performance, there have been provided various means including a high power-pumping laser in order to improve the amplification of the L-EDFA 14 having an inherently low amplification factor. Additional techniques for improving amplification are discussed in U.S. Pat. No. 6,049,417 to Atul Srivastava et al. entitled Wide Band Optical Amplifier, and U.S. Pat. No. 6,049,417 to Atul Srivastava et al. entitled Noise Figure In Optical Amplifiers With A Split-Band Architecture.

SUMMARY OF THE INVENTION

It is an object of the present invention to provide a wide-band optical fiber amplifier for achieving high amplification factor in the 1580 nm wavelength band (L-band) by a simple construction, and method therefor.

It is another object of the present invention to provide a wide-band optical fiber amplifier for effectively amplifying the optical signals of 1580 nm wavelength band by using backward ASE (Amplified Spontaneous Emission) generated during amplifying the optical signals of 1550 nm wavelength band.

According to an aspect of the present invention, a method for amplifying the optical signals of 1550 nm wavelength band and 1580 nm wavelength band in a wide-band optical fiber amplifier, comprises the steps of separating the incoming optical signals into 1550 nm wavelength band and 1580 nm wavelength band, respectively amplifying the optical signals of the 1550 nm wavelength band, and those of the 1580 nm wavelength band, and supplying the backward ASE generated in amplifying the optical signals of the 1550 nm wavelength band as a supplementary pumping light to the amplification of the optical signals of the 1580 nm wavelength band.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Although the EDFAs (erbium doped fiber amplifiers) are used as the optical fiber amplifiers for amplifying the optical signals of the C-band and L-band in the present description, other types of the optical fiber amplifiers may be used.

Figure 1:
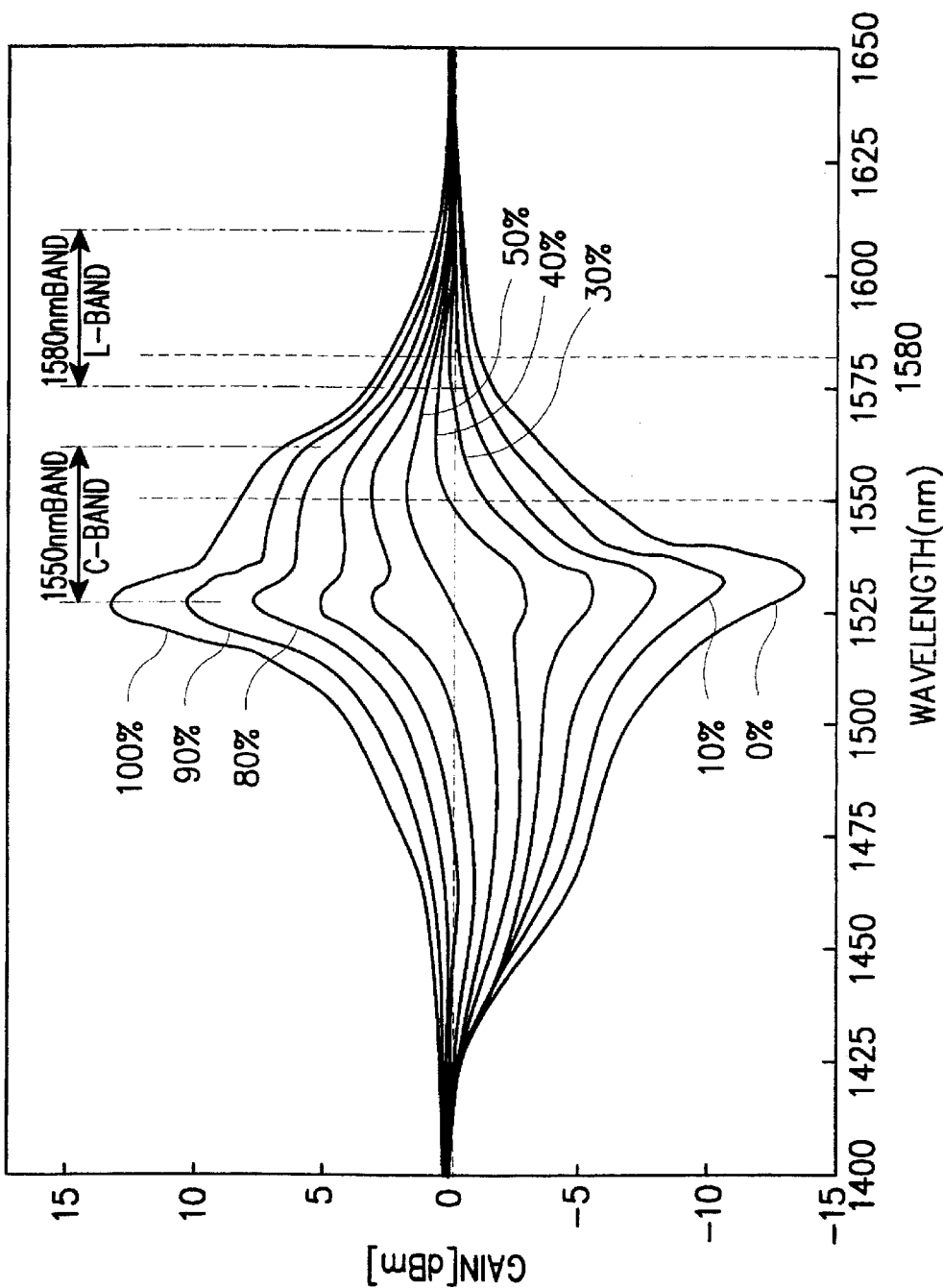
FIG. 1 is a graph for illustrating the gain characteristics of the incoming optical signal of an EDFA according to wavelengths based on the ratio of population inversion of $Er^{+3}$ ions.
Figure 2:
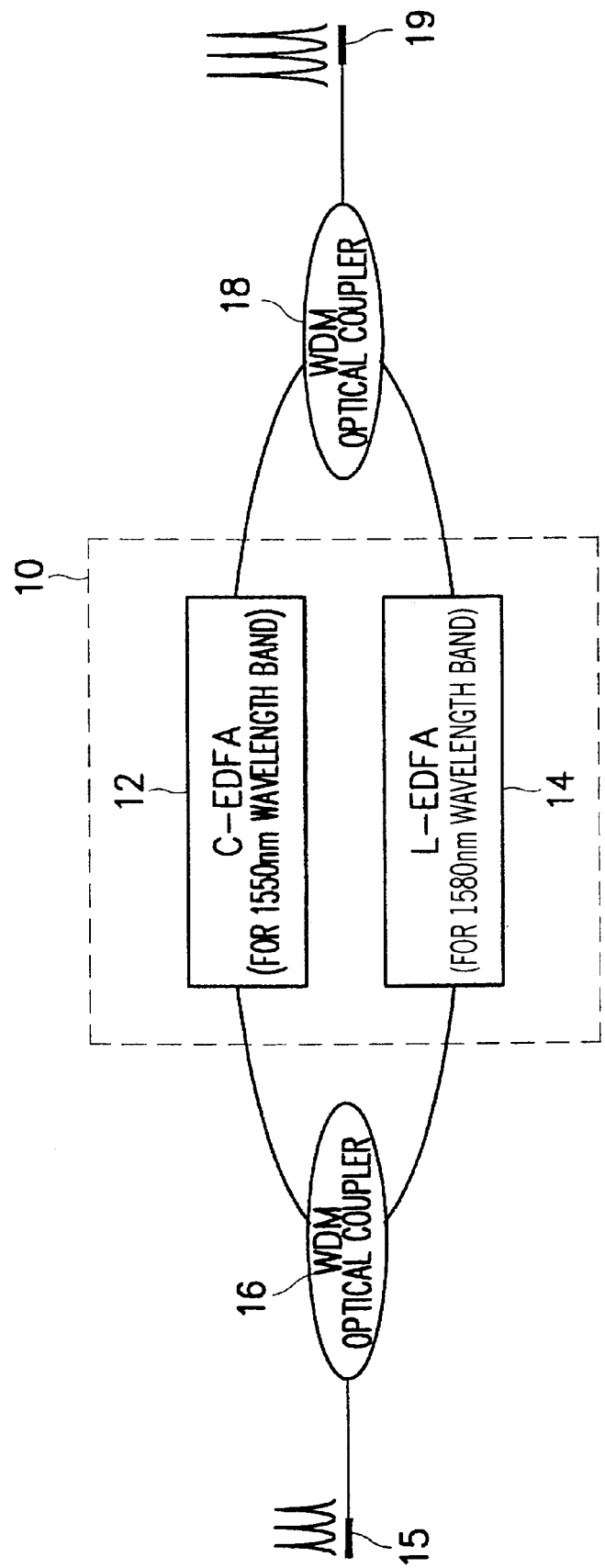
FIG. 2 is a block diagram for illustrating a conventional wide-band optical fiber amplifier system having a parallel amplifying structure.
Figure 3:
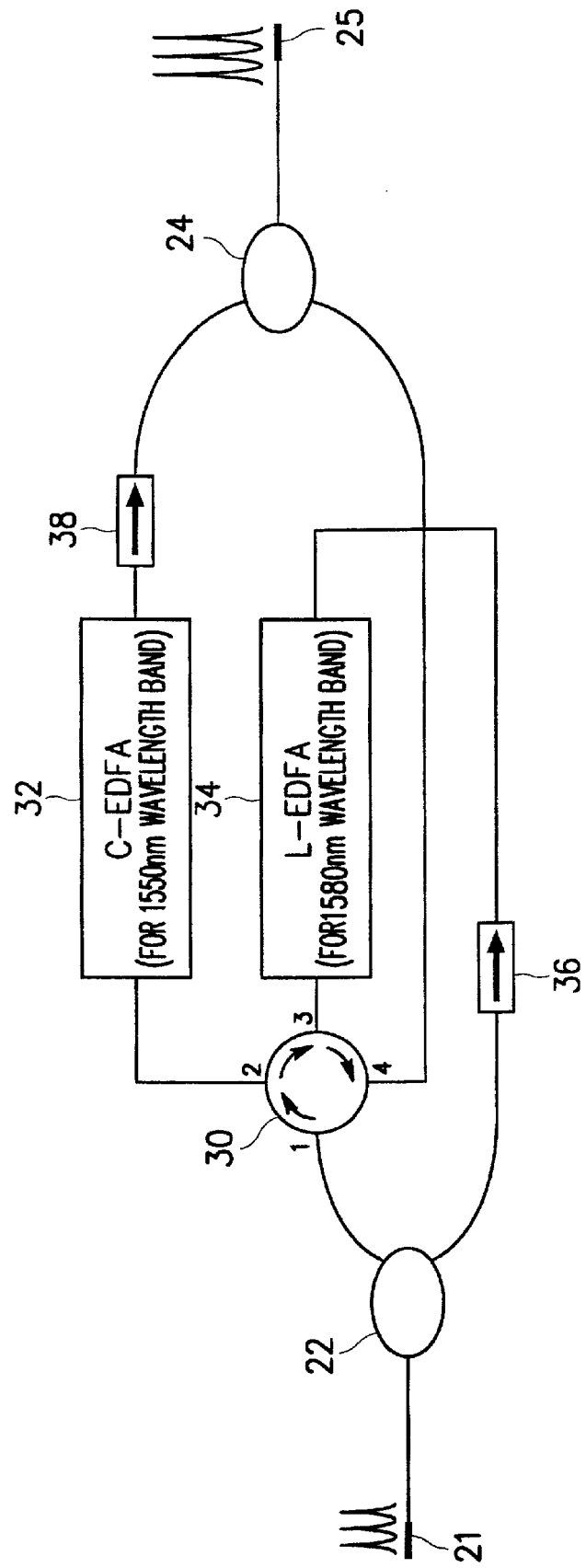
FIG. 3 is a block diagram for illustrating a wide-band optical fiber amplifier system arranged according to a first embodiment of the present invention.

Referring to FIG. 3, a wide-band optical fiber amplifier system according to the first embodiment of the present invention includes an input WDM optical coupler 22 for separating the optical signals received through the input terminal 21 into a C-band (1550 nm wavelength band) and a L-band (1580 nm wavelength band), a C-EDFA 32 for amplifying the optical signals of the C-band separated by the input WDM optical coupler 22, an L-EDFA 32 for amplifying the optical signals of the L-band, and an optical circulator 30 with first (1), second (2), third (3) and fourth (4) terminals serving as the ASE optical path unit for guiding backward ASE generated during the amplification of the C-EDFA 32 to the L-EDFA 34. The optical circulator 30 also guides the optical signals of the C-band from the input WDM optical coupler 22 to the C-EDFA 32.

More specifically, the optical signals of the C-band separated by the input WDM optical coupler 22 are guided through the first terminal 1 of the optical circulator-to the second terminal 2 of the optical circulator- to the input terminal of the C-EDFA 32 and amplified. Meanwhile, the optical signals of the L-band separated by the input WDM optical coupler 22 are input through an optical isolator 36 for blocking backwardly propagated light to the input terminal of the L-EDFA 34. The amplified C-band signals generated by the C-EDFA 32 are output through an optical isolator 38 to an output WDM optical coupler 24. The L-EDFA 34 amplifies the optical signals of the L-band and outputs the amplified signals to the third terminal 3 of the optical circulator 30, which in turn outputs the amplified L-band signals via the fourth terminal 4 of the optical circulator 30 to the output WDM optical coupler 24. The output WDM optical coupler 24 finally combines the optical signals of both the C-band and L-band delivered to the output terminal 25.

Figure 7A:
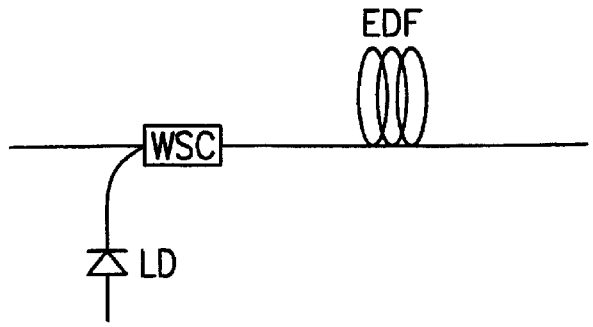
FIGS. 7A, 7B and 7C show schematic diagrams for illustrating the pumping structure used in the optical fiber amplifier.
Figure 7B:
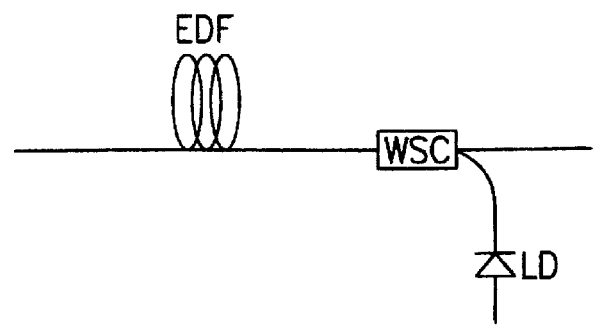
Figure 7C:
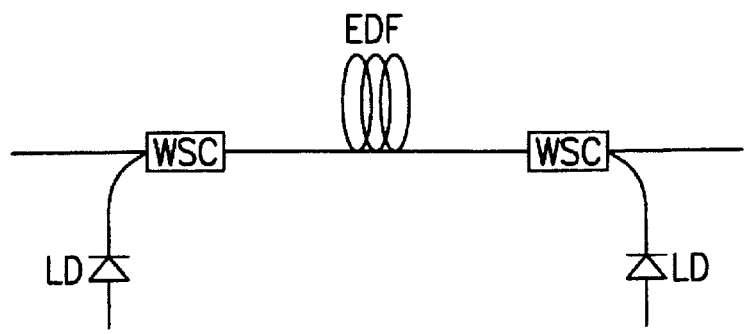

The C-EDFA 32 and L-EDFA 34 may have forward, backward, or two-way pumping structure, as shown respectively in FIGS. 7A to 7C. Namely, the pump from a pumping laser diode (LD) is combined by a wavelength selective coupler (WSC) with the optical signals, supplied to the forward end of the erbium doped fiber (EDF), as shown in FIG. 7A. Likewise, FIG. 7B shows the backward pumping structure for supplying the pump to the backward end of the EDF, and FIG. 7C the pump supplied to both forward and backward end of the EDF. Of course, multi-stage pumping structure may be used combining these three structures.

Meanwhile, the EDF features increased rate of spontaneous emission in the C-band, internally amplified so as to increase loss of the pump, thus decreasing the pumping efficiency. This amplified spontaneous emission (ASE) is used to enhance the amplification efficiency of the L-EDFA 34 according to the present invention. Namely, referring to FIG. 3, the backward ASE generated from the C-EDFA 32 is delivered through the second and third terminals (2 and 3) of optical circulator 30 to the L-EDFA 34 in the backward direction, serving as supplementary pump to increase the amplification efficiency of the L-EDFA 34.

In order to increase the amplification efficiency of the L-EDFA 34 for amplifying the L-band, the present invention employs the backward ASE generated from the C-EDFA 32, as shown in FIG. 3, as the seed beam of the C-band.

Figure 4:
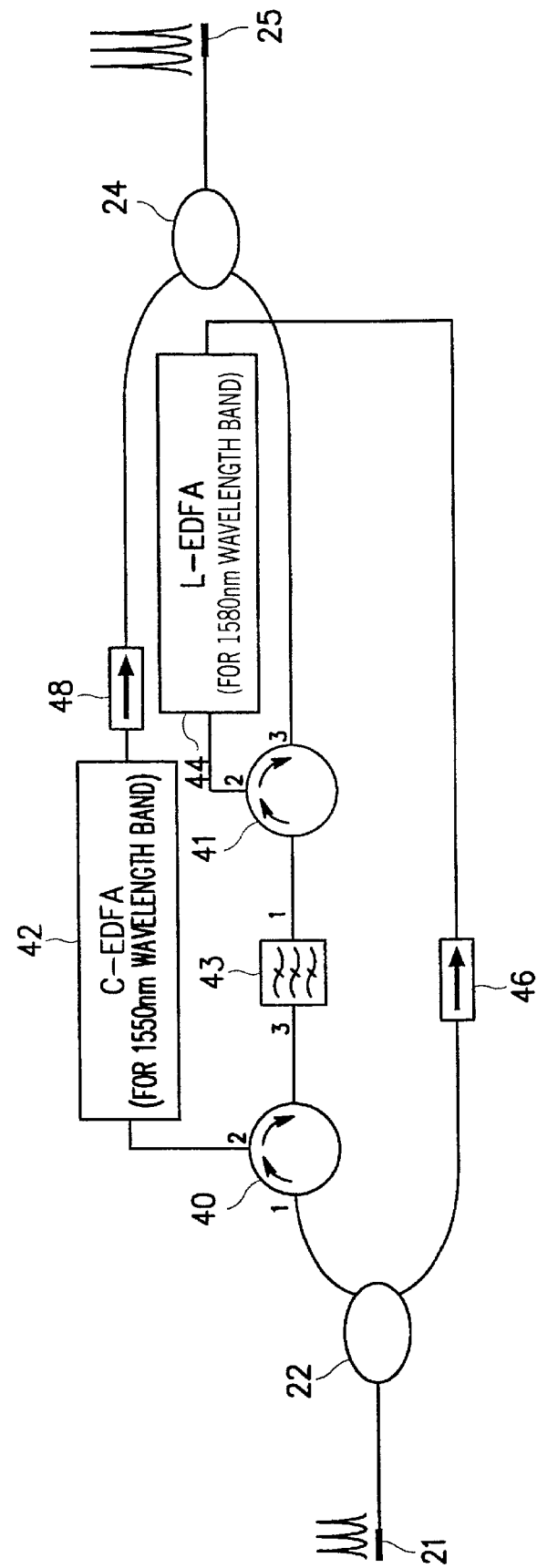
FIG. 4 is a block diagram for illustrating a wide-band optical fiber amplifier system having an optical filter arranged according to a first embodiment of the present invention.

In the second embodiment as shown in FIG. 4, the optical signals of the C-band separated by the input WDM optical coupler 22 are supplied through the first and second terminals (1 and 2) of a first optical circulator 40 to the input terminal of C-EDFA 42, from which the amplified optical signals of the C-band are delivered through an optical isolator 48 to the output WDM optical coupler 24. At the same time, the optical signals of the L-band separated by the input WDM optical coupler 22 are supplied through an optical isolator 46 to L-EDFA 44, from which the amplified optical signals of the L-band are delivered through the second and third terminals (2 and 3) of a second optical circulator 41 to the output WDM optical coupler 24. The output WDM optical coupler 24 finally combines the optical signals of both the C-band and L-band delivered to the output terminal 25.

Meanwhile, the backward ASE generated from C-EDFA 42 is supplied through the second and third terminals (2 and 3) of the first optical circulator 40 to an optical filter 43, which passes the light portion of a predetermined wavelength band, e.g., C-band of the ASE. The filtered ASE is supplied through the first and second terminals (1 and 2) of the second optical circulator 41 to L-EDFA 44 in the backward direction, serving as a supplementary pump to increase the amplification efficiency of the L-EDFA 44. The filter 43 may consist of Fabry-Perot, Mach-Zehnder, etc. In brief, the two optical circulators 40 and 41 and an optical filter 43 serve as the ASE optical path unit to deliver the ASE of the C-band generated from the C-EDFA 42 as the supplementary pump to the L-EDFA 44.

Figure 5:
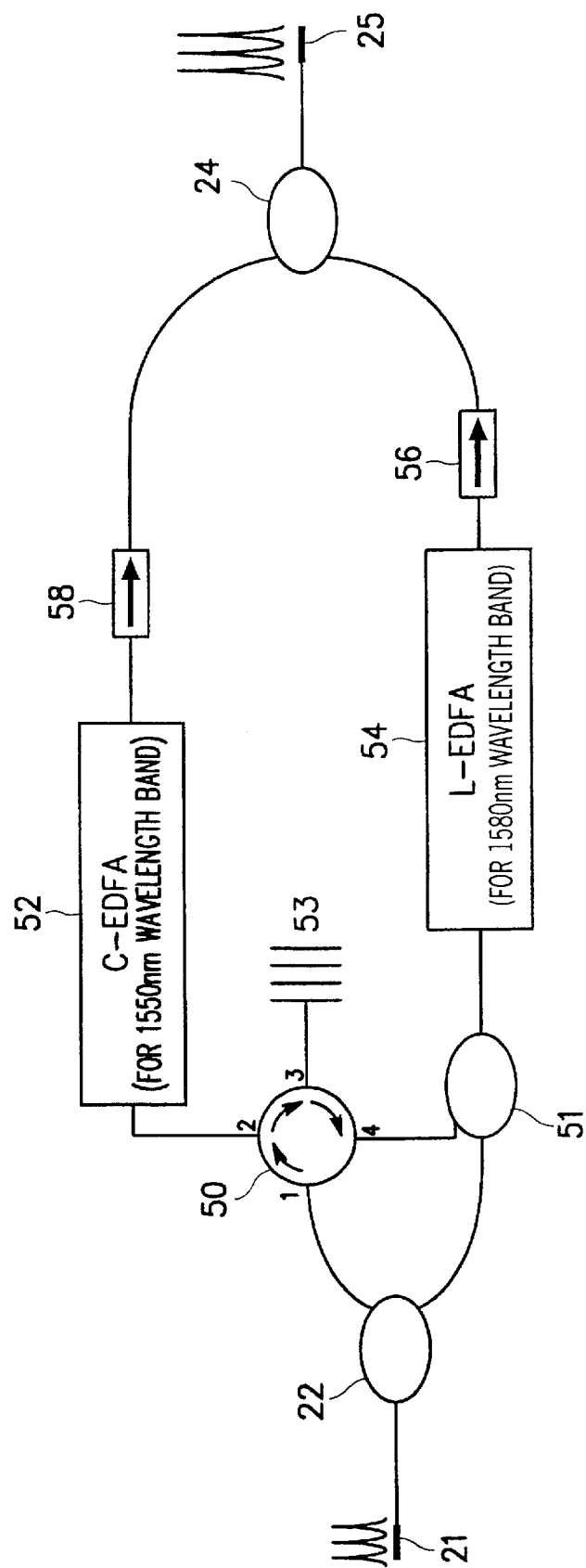
FIG. 5 is a block diagram for illustrating a wide-band optical fiber amplifier system having a reflective optical fiber grating filter arranged according to a third embodiment of the present invention.

In the third embodiment as shown in FIG. 5, there is used a reflective optical fiber grating filter 53. Likewise, the optical signals of the C-band separated by the input WDM optical coupler 22 are supplied through the first and second terminals (1 and 2) of an optical circulator 50 to C-EDFA 52, from which the amplified optical signals are delivered through an optical isolator 58 to the output WDM optical coupler 24.

Meanwhile, the backward ASE generated from the C-EDFA 52 is transferred through the second and third terminals (2 and 3) of optical circulator 50 to the reflective optical fiber grating filter 53 to only reflect the light part of the C-band of the ASE. The ASE thus filtered is supplied through the third and fourth terminals (3 and 4) of optical circulator 50 to a supplementary WDM optical coupler 51, where it is combined with the optical signals of the L-band separated by the input WDM optical coupler 22, and supplied to the L-EDFA 54. L-EDFA 54 outputs the amplified optical signals of the L-band through an optical isolator 56 to the output WDM optical coupler 24. The output WDM optical coupler 24 finally combines the optical signals of both the C-band and L-band delivered to the output terminal 25.

In the third embodiment, the optical circulator 50, optical filter 53 and an additional WDM optical coupler 51 serve as the ASE optical path unit to deliver the ASE of the C-band generated from the C-EDFA 52 as the supplementary pump to the L-EDFA 54. In this case, the backward ASE filtered through the optical filter 53 is supplied through the WDM optical coupler 51 to the L-EDFA 54 in the forward direction. However, if using an additional circulator as shown in FIG. 4 instead of the supplementary WDM optical coupler 51, the system may be designed so that the ASE filtered through the optical filter 53 may be supplied to the L-EDFA 54 in the backward direction.

Figure 6:
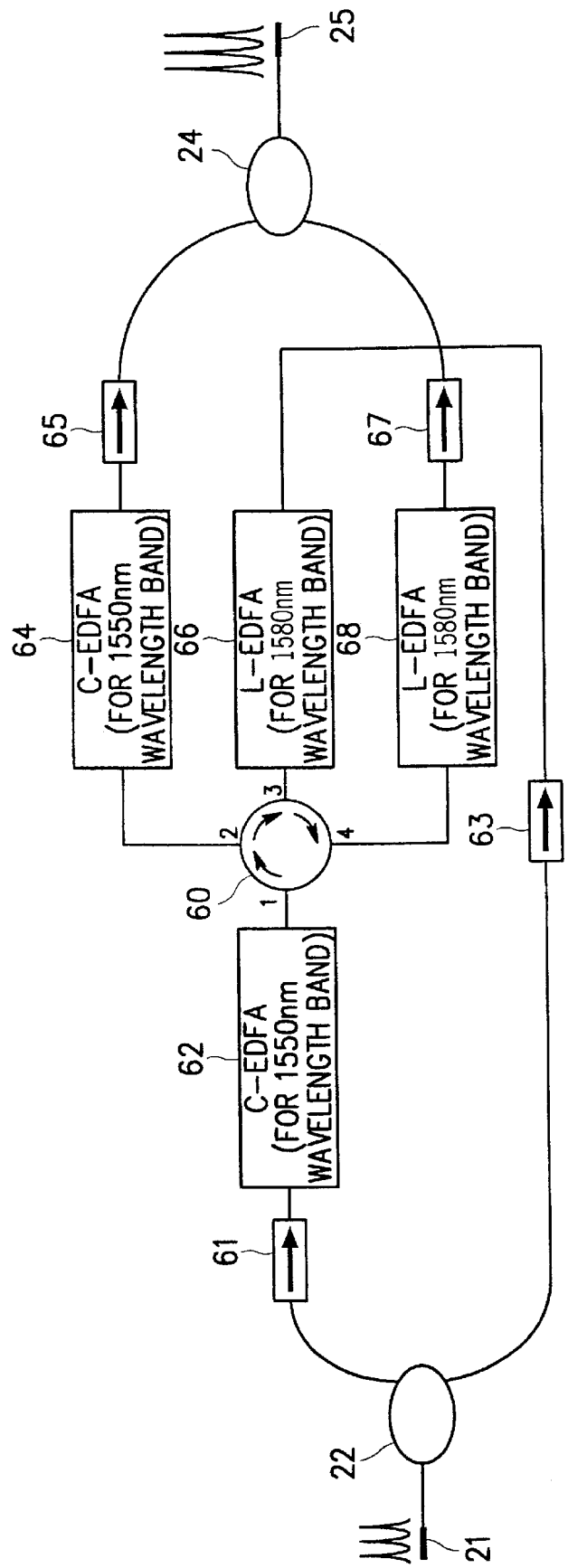
FIG. 6 is a block diagram for illustrating a wide-band optical fiber amplifier system arranged to amplify in two stages according to the fourth embodiment of the present invention.

In the fourth embodiment as shown in FIG. 6, the system is so designed as to amplify the optical signals through two amplifying stages. The optical signals of the C-band separated by the input WDM optical coupler 22 are supplied through an optical isolator 61 to a primary C-EDFA 62, from which the amplified C-band optical signals are supplied through the first and second terminals (1 and 2) of an optical circulator 60 to the input terminal of a secondary C-EDFA 64. The secondarily C-EDFA 64 outputs further amplified C-band optical signals through an optical isolator 65 to the output WDM optical coupler 24.

Meanwhile, the optical signals of the L-band separated by the input WDM optical coupler 22 are supplied through an optical isolator 63 to the input terminal of a primary L-EDFA 66, from which the amplified optical signals of the L-band are supplied through the third and fourth terminals (3 and 4) of optical circulator 60 to a secondary L-EDFA 68, from which the further amplified L-band optical signals are delivered through an optical isolator 67 to the output WDM optical coupler 24.

In this case, the backward ASE generated from the secondary C-EDFA 64 is supplied through the second and third terminals (2 and 3) of the optical circulator 60 to the primary L-EDFA 66 in the backward direction, serving as the supplementary pump to increase the amplification efficiency. Of course, the optical filter as shown in FIGS. 4 and 5 may be added to eliminate any unnecessary wavelength part from the backward ASE. Further, two or more wide-band optical fiber amplifier systems as shown in FIGS. 3 to 5 may be connected in parallel to form a multi-stage amplifier system.

As described above, the invention provides a wide-band optical fiber amplifier system for amplifying the optical signals of both C-band and L-band, which simply uses the backward ASE generated during amplification of the optical signals of the C-band as the supplementary pump applied to the L-band optical fiber amplifier to increase the amplifying efficiency in the L-band, without using an external source.

While the present invention has been described in connection with specific embodiments accompanied by the attached drawings, it will be readily apparent to those skilled in the art that various changes and modifications may be made thereto without departing the gist of the present invention. For example, in the embodiments shown in FIGS. 3 to 6, the optical isolators may be arranged before the input WDM optical coupler 22 and after the output WDM optical coupler 24. Besides, the C-EDFA and L-EDFA as shown in FIGS. 3 to 6 may be designed in many ways as shown in FIGS. 7A to 7C, and employ Al co-doped EDF or fluorinated EDF for achieving flattened gain and low noise characteristics.

What is claimed is:

1. A method for amplifying the optical signals in a wide-band optical fiber amplifier, comprising the steps of:
   separating incoming optical signals into a first wavelength band and a second wavelength band;
   s respectively amplifying the optical signals of said first wavelength band, and those of said second wavelength band;
   filtering a backward ASE (Amplified Spontaneous Emission) generated during the amplifying of the optical signals of said first wavelength band; and
   supplying the filtered backward ASE as a supplementary pumping light for use in the amplifying of the optical signals of said second wavelength band.

2. The method as set forth in claim 1, wherein the backward ASE belongs to a predetermined wavelength band.

3. The method as set forth in claim 1, wherein the backward ASE belongs to a 1550 nm wavelength band.

4. The method as set forth in claim 1, wherein the first wavelength band is a 1550 nm wavelength band.

5. The method as set forth in claim 1, wherein the second wavelength band is a 1580 nm wavelength band.

6. The method as set forth in claim 1, wherein the first wavelength band is a 1550 nm wavelength band and the second wavelength band is a 1580 nm wavelength band.

7. The method as set forth in claim 1, further comprising a step of filtering the backward ASE before use in the amplifying of the optical signals of said second wavelength band.

8. The method as set forth in claim 1, wherein the step of filtering utilizes an optical filter of a predetermined band.

9. The method as set forth in claim 1, wherein the step of filtering utilizes a reflective filter.

10. A wide-band optical fiber amplifier system provided with a C-band (Conventional-band) optical fiber amplifier for amplifying the optical signals of a 1550 nm wavelength band and a L-band (Long-band) optical fiber amplifier for amplifying the optical signals of a 1580 nm wavelength band, comprising:
   an input WDM (Wavelength Division Multiplex) optical coupler for separating incoming optical signals into a 1550 nm wavelength band and a 1580 nm wavelength band;
   an ASE (Amplified Spontaneous Emission) optical path unit for guiding a backward ASE, generated by said C-band optical fiber amplifier during the amplification of said the optical signals of 1550 nm wavelength band, to said L-band optical fiber amplifier; and
   an output WDM optical coupler for combining the optical signals amplified by said C-band optical fiber amplifier and the optical signals amplified by said L-band optical fiber amplifier as an output optical signal, wherein said ASE optical path unit comprises an optical circulator for supplying the optical signals of said 1550 nm wavelength band from said input WDM optical coupler to said C-band optical fiber amplifier, supplying said backward ASE to said L-band optical fiber amplifier in the backward direction, and supplying the amplified optical signals of the 1580 nm wavelength band generated by said L-band optical fiber amplifier to said output WDM optical coupler.

11. The wide-band optical fiber amplifier system as set forth in claim 10, wherein said optical circulator comprises:
  a first optical circulator having first, second and third terminals, the optical signals of said 1550 nm wavelength band being supplied from said input WDM optical coupler to said C-band optical amplifier through the first and second terminals of said first optical circulator, said backward ASE being supplied from said C-band optical amplifier to said L-band optical fiber amplifier through the second terminal of said first optical circulator to said third terminal of said first optical circulator;
  an optical filter of a predetermined wavelength band for filtering said backward ASE output from the third terminal of said first optical circulator; and
  a second optical circulator having first and second terminals for guiding the filtered ASE output by said optical filter to said L-band optical fiber amplifier, wherein said L-band optical fiber amplifier amplifies said optical signals of said 1580 nm wavelength band separated by said input WDM optical coupler, said amplified optical signals of said 1580 nm wavelength band being supplied from said L-band optical fiber amplifier through the second terminal of said second optical circulator to said third terminal of said second optical circulator to said output WDM optical coupler.

12. The wide-band optical fiber amplifier system as set forth in claim 10, wherein said ASE optical path unit further comprises an optical filter of a predetermined wavelength band for filtering said backward ASE and supplying the filtered backward ASE to said L-band optical amplifier.

13. The wide-band optical fiber amplifier system as set forth in claim 12, wherein said optical filter is a reflective optical fiber grating filter.

14. A wide-band optical fiber amplifier system provided with a C-band optical fiber amplifier for amplifying the optical signals of a 1550 nm wavelength band and a L-band optical fiber amplifier for amplifying the optical signals of a 1580 nm wavelength band, comprising:
  an input WDM (Wavelength Division Multiplex) optical coupler for separating incoming optical signals into a 1550 nm wavelength band and a 1580 nm wavelength band;
  a first optical circulator having first, second and third terminals, the optical signals of said 1550 nm wavelength band being supplied from said input WDM optical coupler to said C-band optical amplifier through the first and second terminals of said first optical circulator, wherein a backward ASE (Amplified Spontaneous Emission) is generated by said C-band optical fiber amplifier during the amplification of said the optical signals of 1550 nm wavelength band, said backward ASE being supplied from said C-band optical amplifier to said L-band optical fiber amplifier through the second terminal of said first optical circulator to said third terminal of said first optical circulator;
  an optical filter of a predetermined wavelength band for filtering said backward ASE output from the third terminal of said first optical circulator to produce a filtered ASE having said predetermined wavelength;
  a second optical circulator having first and second terminals for guiding the filtered ASE output by said optical filter to said L-band optical fiber amplifier, wherein said L-band optical fiber amplifier amplifies said optical signals of said 1580 nm wavelength band separated by said WDM optical coupler, said amplified optical signals of said 1580 nm wavelength band being supplied from said L-band optical fiber amplifier through the second terminal of said second optical circulator to a third terminal of said second optical circulator; and
  an output WDM optical coupler for generating an output optical signal by combining said amplified optical signals of said 1550 nm wavelength band amplified by said C-band optical amplifier and said amplified optical signals of said 1580 nm wavelength band output via said third terminal of said second optical circulator.

15. A wide-band optical fiber amplifier system provided with a C-band optical fiber amplifier for amplifying the optical signals of 1550 nm wavelength band and a L-band optical fiber amplifier for amplifying the optical signals of 1580 nm wavelength band, comprising:
  an input WDM (Wavelength Division Multiplex) optical coupler for separating the incoming optical signals into said 1550 nm wavelength band and said 1580 nm wavelength band;
  a reflective optical fiber grating filter of a predetermined wavelength band for filtering predetermined optical signals to produce a filtered light portion corresponding to said predetermined wavelength band;
  an optical circulator having first, second, third and fourth terminals, wherein said first and second terminals guide the optical signals of said 1550 nm wavelength band from said input WDM optical coupler to said C-band optical fiber amplifier and a backward ASE (Amplified Spontaneous Emission), generated by said C-band optical fiber amplifier during the amplification of said the optical signals of 1550 nm wavelength band, is supplied from said C-band optical amplifier through the second and third terminals to said reflective optical fiber grating filter as said predetermined optical signals, wherein said reflective optical fiber grating filter reflects a filtered ASE back through the third terminal of the optical circulator to the fourth terminal of the optical circulator;
  a second WDM optical coupler for combining the filtered ASE supplied from the fourth terminal of the optical circulator and the optical signals of said 1580 nm wavelength band separated by said input WDM optical coupler, and for providing the combined optical signals to said L-band optical fiber amplifier to amplify said optical signals of said 1580 nm wavelength band; and
  an output WDM optical coupler for generating an output optical signal by combining the amplified optical signals of said 1550 nm wavelength band amplified by said C-band optical amplifier and the amplified optical signals of said 1580 nm wavelength band amplified by said L-band optical fiber amplifier.

16. A wide-band optical fiber amplifier system arranged to amplify the incoming optical signals in two stages, comprising:
  an input WDM (Wavelength Division Multiplex) optical coupler for separating said incoming optical signals into 1550 nm wavelength band and 1580 nm wavelength band;

a primary C-band optical fiber amplifier for primarily amplifying the optical signals of said 1550 nm wavelength band separated by said input WDM optical coupler;

a secondary C-band optical fiber amplifier for secondarily amplifying the optical signals received from said primary C-band optical fiber amplifier;

a primary L-band optical fiber amplifier for primarily amplifying the optical signals of said 1580 nm wavelength band separated by said input WDM optical coupler;

a secondary L-band optical fiber amplifier for secondarily amplifying the optical signals received from said primary L-band optical fiber amplifier;

an ASE (Amplified Spontaneous Emission) optical path unit for guiding a backward ASE, generated during the amplification by said secondary C-band optical fiber amplifier, to said primary L-band optical fiber amplifier; and an output WDM optical coupler for combining the optical signals amplified by said secondary C-band optical amplifier and those amplified by said secondary L-band optical amplifier as output optical signals.

17. The wide-band optical fiber amplifier system as set forth in claim 16, wherein said ASE optical path unit comprises an optical circulator for guiding the optical signals output from said primary C-band optical fiber amplifier to said secondary C-band optical fiber amplifier, the backward ASE generated by said secondary C-band optical fiber amplifier to said primary L-band optical fiber amplifier in the backward direction, and the optical signals output from said primary L-band optical fiber amplifier to said secondary L-band optical fiber amplifier.

18. The wide-band optical fiber amplifier system as set forth in claim 16, wherein said ASE optical path unit comprises an optical filter of a predetermined wavelength band for filtering said backward ASE generated by said secondary C-band optical fiber amplifier to supply a filtered ASE having said predetermined wavelength to said secondary L-band optical amplifier.

19. The wide-band optical fiber amplifier system as set forth in claim 10, wherein said optical circulator optical circulator comprises:

first, second, third and fourth terminals, wherein said first and second terminals guide the optical signals of said 1550 nm wavelength band from said input WDM optical coupler to said C-band optical fiber amplifier, the backward ASE is supplied from said C-band optical amplifier through the second and third terminals to a reflective optical fiber grating filter, said reflective optical fiber grating filter reflects a filtered ASE back through the third terminal of the optical circulator to the fourth terminal of the optical circulator; and a third WDM optical coupler for combining the filtered ASE supplied from the fourth terminal of the optical circulator and the optical signals of said 1580 nm wavelength band separated by said input WDM optical coupler, and for providing the combined optical signals to said L-band optical fiber amplifier to amplify said optical signals of said 1580 nm wavelength band.

* * * * *